2,702,096

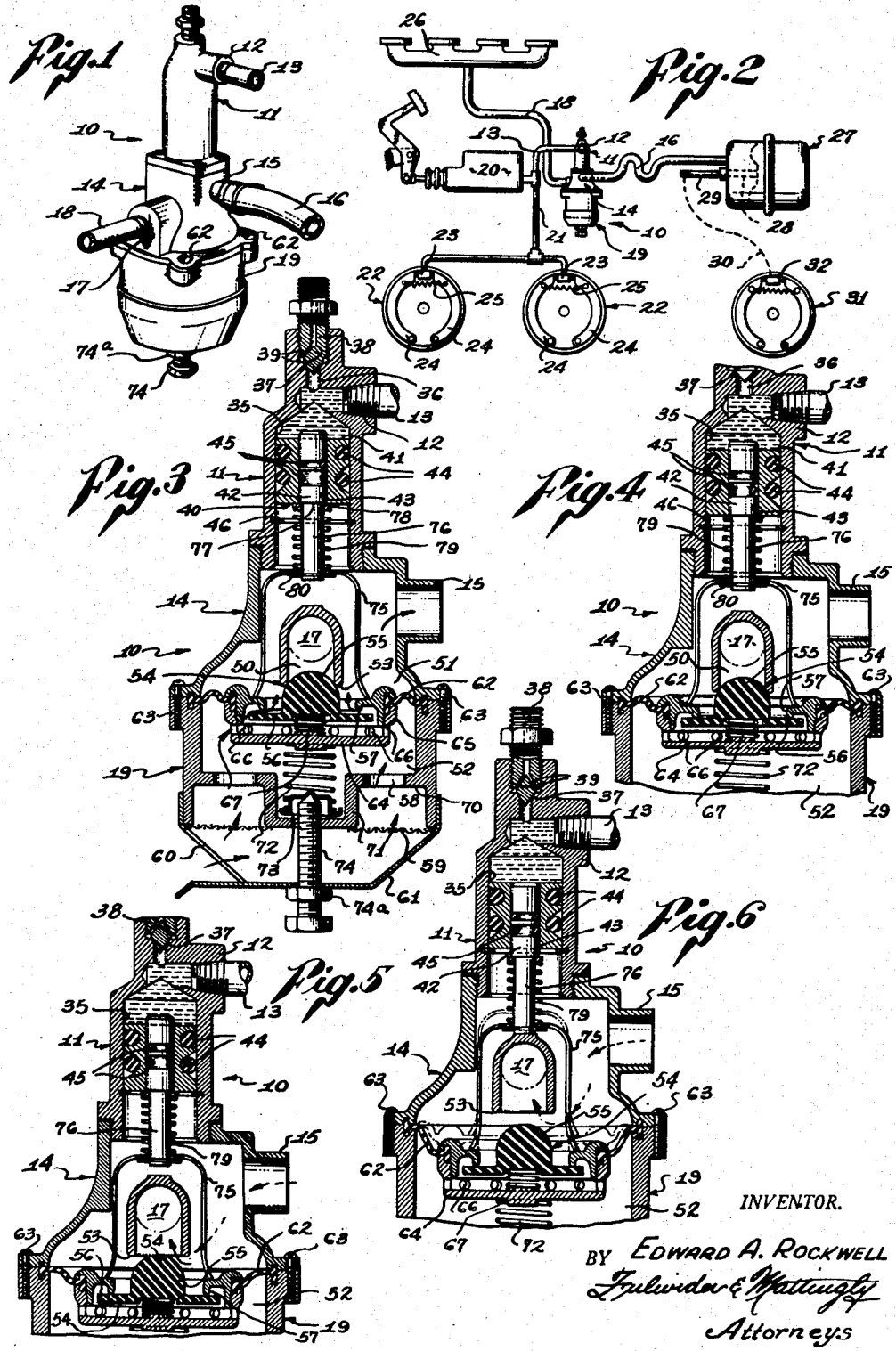
Feb. 15, 1955    E. A. ROCKWELL    2,702,096
PRIMARY-SECONDARY BRAKE SYSTEM AND RELAY VALVE THEREOF
Filed Oct. 28, 1950
INVENTOR.
BY EDWARD A. ROCKWELL
Attorneys United States Patent Office 2,702,096
Patented Feb. 15, 1955

PRIMARY-SECONDARY BRAKE SYSTEM AND RELAY VALVE THEREOF

Edward A. Rockwell, Los Angeles, Calif.

Application October 28, 1950, Serial No. 192,648

16 Claims. (Cl. 188—3)

The present invention relates generally to hydraulic brakes which are actuated by means of an air-vacuum power unit, and more particularly, to a system of the class described in which the hydraulic pressure rise in one set of brakes is used to control the actuation of the air-vacuum power unit of another set of brakes.

It is customary practice in truck-trailer combinations to provide in the tractor and in the trailer separate brake actuating means, each having its own power unit and the two systems being interconnected only by a control line whereby the trailer brakes are operated in response to some change of condition in the tractor system. The latter change can be, for example, the rise in pressure in the power booster unit, or alternatively, the control pressure can be derived from the master cylinder pressure in the tractor. In the latter case, it is possible to arrange a system in which only the trailer brakes are power-actuated, the tractor brakes being operated by manually produced pressure from a conventional master cylinder, and the rise in such master cylinder pressure being used to actuate a relay to provide the power for the trailer brakes.

The last-described system is of particular advantage in the case of house trailers and other relatively light duty trailers which are intended to be drawn by pleasure cars or light trucks which are not provided with booster power brakes. The usual arrangement is to mount a conventional air-suspended or vacuum-suspended power unit on the trailer and a relay valve on the tractor, the relay valve having its actuating line connected to the hydraulic brake system in the tractor, and having a flexible air conduit leading to the power unit on the trailer. Thus, when the brakes are applied in the tractor unit, the rise in master cylinder pressure actuates the relay to deliver the operating pressure (either vacuum or air) to the trailer brakes.

Several characteristics are essential to the successful operation of a system such as that just described. First of all, it is highly desirable that the trailer brakes be applied at least simultaneously, if not slightly before those in the tractor. If this is not the case, there is often a tendency for the trailer to jack-knife due to the fact that the tractor is decelerating while the trailer is not. The point at which the relay valve is first actuated to deliver pressure to the power unit is called the "cut in" point. The pressure in the master cylinder at the point where the valve is first actuated to deliver power pressure is called the "cut in" pressure.

Secondly, the conventional non-commercial vehicle or light truck is not equipped with booster brakes, and thus operates with a relatively high range of master cylinder pressure (for example, from 8 to 700 p. s. i.), and accordingly, it is desirable to produce a relay valve which will accurately modulate the trailer brake pressure over the relatively wide range of master cylinder pressures just mentioned. It will be realized, of course, that by the term "modulate" is meant the gradual increasing or decreasing of brake pressure as opposed to a system in which the trailer brakes are either substantially on or substantially off.

Furthermore, it is desirable that a relatively small volume of actuating fluid be required to actuate the valve since conventional pleasure car brake systems do not provide much excess fluid over that required to operate the primary brake motors.

Still further, it is desirable that the relay valve incorporated in the system just described be capable of easy adjustment to suit various combinations of tractor and trailer.

Bearing in mind the foregoing desiderata, it is a major object of the present invention to provide a relay valve for use in controlling air-vacuum hydraulic brake systems which is adapted to modulate continuously in response to a relatively wide range of actuating pressures.

It is another object of the invention to provide in a valve of the character described, compound pressure sensing means such that the valve responds in the initial part of the actuating-pressure range to relatively small changes in pressure, and in a second part of said range, to relatively greater changes in actuating pressure.

It is still another object of the invention to provide a valve of the class described which requires a minimum volume of actuating fluid while maintaining substantially continuous modulation over its entire range of actuating pressures.

A further object of the invention is to provide means in a valve of the class described for adjusting the "cut in" point to suit various conditions of operation.

The foregoing and additional objects and advantages of the invention will be apparent from the following detailed description of a preferred embodiment thereof, such consideration being given likewise to the attached drawing, in which:

Figure 1 is a perspective view of a relay valve embodying the invention;

Figure 2 is a semi-schematic diagram illustrating the incorporation of the valve of Figure 1 in a tractor-trailer brake system;

Figure 3 is an enlarged elevational section of Figure 1 showing the valve in its "off" or non-operating condition; and Figures 4, 5 and 6 are fragmentary elevational sections taken on the same plane as Figure 3, and showing the valve in successive stages of its operational cycle.

In the drawing, I have identified the relay valve unit embodying the present invention by the reference character 10, and referring to Figure 1, it will be seen to comprise a hydraulic actuating cylinder section 11 provided with a fluid connection 12 to receive a hydraulic line 13, an intermediate valve body section 14 having fluid connections 15 and 17 to receive a power pressure delivery conduit 16 and a vacuum line 18, respectively, and a lower section 19 including valve adjustment means hereinafter to be described, and an air cleaner.

In Figure 2, a tractor-trailer brake system embodying the valve 10 is illustrated, and includes a conventional master cylinder and pedal linkage assembly 20, mounted in the tractor and connected by the pressure line 13 to the valve 10 (also mounted in the tractor), and by a branch line 21 to the motor cylinders 23 of the tractor brakes 22. Vacuum is supplied to the valve 10 from the intake manifold 26 of the tractor through the conduit 18, and the power pressure (in the present illustrated embodiment, vacuum) is delivered to the trailer brake system through a flexible conduit 16. In the trailer is provided a brake power unit 27 having a diaphragm actuated plunger 28 therein, operating through well known mechanism and linkage indicated schematically by a dotted line 30 to operate a conventional trailer brake 31. The power unit 27, being of conventional design, need not be shown in great detail. It will also be understood that while only two brake drums are shown in the tractor brake system and one in the trailer brake system, any number of brake motor cylinders can be connected to the system in the usual manner.

Turning now to a discussion of the interior construction of the valve 10, reference should be had to Figure 3. The hydraulic actuating section 11 is disposed at the top of the valve 10, and is axially bored to provide a hydraulic cylinder 35 which is communicated with the actuating pressure line 13, as shown. Also communicated with the cylinder 35 is an air bleed passageway 36 having a valve seat 37 at the upper end thereof against which a needle valve member 38 is normally seated. When the system is initially installed, and at such other times as may be desirable, the needle valve 38 may be unscrewed to unseat the same from the valve seat 37 and permit air to escape upwardly past the valve seat 37 and out of the system through a branched passageway 39 formed in the needle valve 38.

A hydraulic actuating piston assembly 40 is positioned in the cylinder 35 for axial movement therein. The piston assembly 40 includes an outer, large piston 41 in direct sliding contact with the cylinder 35, and a small, high-pressure plunger 42 mounted in an axial bore 43 in the piston 41. The outer, or large piston 41 is provided with conventional O-ring seals 44, and similar members 45 are provided surrounding the plunger 42 within the bore 43.

In internal snap ring 46 mounted in a complemental groove in the wall of the cylinder 35 limits the axial movement of the piston 41. As will hereinafter be described, however, the plunger 42 may continue to move axially within the piston 41 after the latter is seated against the limiting snap ring 46.

Within the valve body section 14 are the elements of a three-way valve which serve to selectively deliver a predetermined operating pressure to the power unit 27 in the trailer. The outer walls and interior partitions of the section 14 cooperate to provide three separable chambers, to wit, a vacuum chamber 50, communicated through the conduit connection 17 to the manifold 26 as aforesaid, an operating power chamber 51 communicated through the fluid connection 15 to the power unit 27 as aforesaid, and an atmospheric pressure chamber 52 contained within the lower body section 19 and vented to atmosphere through internal apertures 58, an air cleaner 59 and an opening 60 in a lower cover 61.

A generally hat-shaped valving member 54 centrally located in the valve section 14 serves to selectively control the intercommunication of the chambers 50, 51 and 52. The valving member 54 is constructed of a relatively soft resilient material, such as rubber, synthetic rubber, or the like, and is formed with an upwardly projecting dome portion 55 adapted to seat against an annular seat 53 at the lower end of the vacuum chamber 50. When the valving member 54 is moved downwardly, as will hereinafter be described, the dome portion 55 is lowered away from the seat 53 to intercommunicate the vacuum in the chamber 50 with the power pressure chamber 51.

The valving member 54 is also formed with an outwardly projecting rim or flange 56 which is positioned and adapted to cooperate with an annular valve seat 57 to selectively separate or intercommunicate the power pressure chamber 51 and the atmospheric pressure chamber 52.

The annular valve seat 57 is movably carried by an annular flexible diaphragm 62, the outer periphery of which is clamped between the valve body section 14 and the lower body section 19, which sections are secured together by peripheral bolts 63. The movable valve seat 57 is secured to the inner periphery of the diaphragm 62 by a similar edge clamp comprising the valve seat 57 and a circular cage member 64 which is threaded to the valve seat 57 at 65. A number of circumferentially spaced apertures 66 in the cage 64 serve to intercommunicate the atmospheric pressure chamber 52 through the valve port 56—57 to the power pressure chamber 51 when the last-named valve port is opened, as will hereinafter be described.

Between the cage 64 and the valving member 54 is a relatively light spring 67 which normally holds the rim 56 of the valving member 54 up against the valve seat 57. The lower wall 70 of the atmospheric pressure chamber 52 is provided with a downwardly projecting cup-shaped portion 71, containing a compression spring 72 which thrusts upwardly against the center of the cage 64, normally urging the movable valve seat 57 upwardly. Means to adjust the force exerted by the compression spring 72 is provided in the form of a lower spring anchor member 73 supported on the end of an adjusting screw 74 threaded into the bottom of the cup-shaped projection 71. Thus, by rotating the screw 74 in one direction or another, the upward force exerted on the cage 64 and valve seat 57 can be adjusted, and the screw locked by a nut 74a thereon.

As can be seen from an examination of Figure 3, the valve port 56—57 is open when the valve is in its normal, or unoperated position, hence atmospheric pressure is communicated through the flexible conduit 16 to the power unit 27 and the trailer brakes 31 are thus held in "off" position. It will also be noted that the dome 55 of the valving member 54 is held firmly against the valve seat 53, thus isolating the vacuum chamber 50. The first-mentioned valve port 56—57 is held open by the fact that the movable valve seat 57 is urged upwardly by the spring 72 while the seating of the dome 55 against the seat 53 prevents the valving member 54 from following the valve seat 57.

The actuating piston assembly 40 is operatively connected to the movable valve seat 57 by means of an inverted U-shaped bail 75, the lower ends of which rest against diametrically opposite points on the valve seat 57 and the upper arm of which embraces the lower end of a stem 76 formed on the plunger 42. As can be seen best in Figure 3, the diameter of the stem 76 is less than that of the plunger 42, whereby to form a shoulder 77 at the juncture between the stem 76 and the plunger 42 proper. Anchored against the shoulder 77 by an anchor ring 78 is a compression spring 79 which thrusts downwardly against the bail 75. A snap ring 80 in a groove on the end of the stem 76 prevents the spring 79 from pushing the bail off the end of the stem 76. It will be noted that the spring anchor ring 78 is of sufficient diameter to abut the outer piston 41, so that downward movement of either the piston 41 or the plunger 42, or both, results in pressure being transmitted through the spring 79 and the bail 75 to the movable valve seat 57.

Operation

As has previously been described, the valve 10 normally assumes the position illustrated in Figures 3, i. e., with the vacuum valve port 53—55 closed and the atmospheric valve port 56—57 open. Upon the initial application of the tractor brakes, the hydraulic pressure in the master cylinder 20 rises, and such increased pressure is communicated to the actuating cylinder 35, causing the actuating piston assembly 40 to move downwardly, as shown in Figure 4, both the piston 41 and the plunger 42 moving together, and forcing the movable valve seat 57 down into contact with the rim 56 of the valving member 54 to close off the atmospheric pressure chamber 52 from the power pressure chamber 51.

Thereafter, continued downward movement of the actuating piston assembly 40 moves the dome 55 of the valving member 54 away from the valve seat 53 to communicate the vacuum chamber 50 with the power pressure chamber 51, which vacuum is communicated to the power unit 27 and applies initial braking fluid pressures through the conduit 30 to the trailer brakes 31.

This initial brake applying condition is illustrated in Figure 5, wherein it will be seen that the dome 55 is raised a considerable distance above the valve seat 53, and wherein the flow of air from the power chamber 27 into the vacuum chamber 50 is illustrated by dotted arrows. Until the power unit 27 has been evacuated of air, the degree of vacuum in the power pressure chamber 51 does not rise to an appreciable value.

As soon as the power unit 27 is substantially evacuated, however, the degree of vacuum rises in the chamber 51 and results in an upward force being exerted on the valving member 54 and the valve seat 57, due to the differential pressures in the power pressure chamber 51 and the atmospheric pressure chamber 52, respectively.

Thus, the downward force exerted by the piston assembly 40 is resisted by the upward force exerted by the differential fluid pressures on opposite sides of the diaphragm 62. Whenever the upward force exerted by the differential fluid pressure is sufficient to compress the spring 79, the valving member 54 is restored to its closed position, the bail 75 sliding along the plunger stem 76, as indicated by the dotted lines in Figure 6. The downward force exerted by the piston assembly on the spring 79 will, of course, be equal at all times to the upward force exerted by the diaphragm and the lower spring 72.

The net effect of the balancing of forces just described is to create in the power unit 27 a hydraulic pressure-creating force which is at all times proportional to the hydraulic pressure in the master cylinder 20. Thus, the braking forces exerted in the trailer brakes 31 are always proportional to the hydraulic pressure in the master cylinder 20. It should be noted, however, that the ratio of the just-named proportion is different during the initial part of the operational cycle of the relay valve 10 in which the piston 41 is moving down against the limiting snap ring 46, than it is thereafter when the hydraulic pressure in the cylinder 35 is being transmitted through the plunger 42 alone. Thus, the compound piston design permits substantially continuous modulation over the entire range of hydraulic pressures exerted by the master cylinder 20 without requiring an excessive amount of fluid from the tractor brake system.

By adjusting the upward force exerted by the lower compression spring 72 through appropriate manipulation of the adjustment screw 74, the relay valve 10 can be adjusted to apply the trailer brakes 31 simultaneously with, or preferably just prior to the application of the tractor brakes 22. This is accomplished by so adjusting the forces exerted on the valve seat 57 that the valve port 53—55 is "cracked," i. e., opened slightly, as soon as there is any substantial increase in hydraulic pressure in the master cylinder 20 and before such pressure has been increased sufficiently to overcome the force of the brake springs 25 in the tractor brakes. The aforesaid cracking of the valve 53—55 results in initial movement of the trailer brakes to move the shoes into place against the drums, and to apply a slight braking pressure before any appreciable movement of the tractor brakes 22 takes place.

The following pressure values are given by way of example only, it being realized that considerable variation will occur between various makes of automobiles, and furthermore, any given automobile will vary from time to time as the parts of the braking system wear, and as leakage of the hydraulic fluid occurs.

Normally a residual pressure on the order of 7 to 8 pounds is maintained in the hydraulic fluid system in order to prevent air from being drawn into the system when the brakes are released. When the brakes are first applied, the initial rise in pressure up to about 30 pounds is consumed in elongating the brake springs (e. g., springs 25 in the tractor brakes 22) before any actual braking resistance is effected by contact of the shoes with the drums. Thereafter, the increased force on the brake pedal produces a rising hydraulic pressure that may reach as high as 800 p. s. i. The pressure of the shoes against the drums at all points between 30 and 800 p. s. i. is substantially proportional to the then hydraulic pressure.

Thus, it will be seen that if the presently illustrated valve 10 is adjusted to effect operation of the power unit 27 at some point between the master cylinder pressure of 8 pounds and 30 pounds in the example just given, the shoes in the trailer brakes 31 will be moved into place and will be exerting slight pressure before the tractor brakes come into operation. Furthermore, it will be seen that such adjustment can be made for various combinations of tractor and trailer having residual and operating pressures other than those above described.

From the foregoing description and operation it will be realized that if only a single pressure-sensing system, for example, the piston 41, were to be employed, a relatively long stroke would be required, thus consuming a considerable amount of fluid. Also, the compression spring 79 through which the force exerted by the piston assembly 40 is transmitted to the valve members would have to be of considerable length in order to have an appropriate rate to balance off the valve and achieve continuous modulation of the character previously described. Thus, the present construction gives the additional advantage of compactness, without a sacrifice of continuous and accurate modulation.

A still further advantage of the present construction is the fact that the seal rings 44 and 45 present a certain irreduceable minimum resistance to movement of the piston assembly 40, and that, accordingly, the piston 41 must be of substantial diameter at the initial part of the stroke where the hydraulic pressures are quite low. On the other hand, when the hydraulic pressure in the cylinder 35 has risen to a substantial amount, then a force several times the frictional resistance exerted by the seal rings 45 can be exerted with a relatively smaller diameter member, to wit, the plunger 42.

Assuming in the illustrated example that the tractor and trailer brakes were of similar characteristics, i. e., required substantially equal hydraulic pressures to achieve a given decelerative braking force, the valve 10 would be adjusted so that the ratio between the tractor hydraulic pressure during the initial movement of the piston 41 gave an increased hydraulic pressure in the trailer system, and such ratio thereafter (during operation by the plunger 42 alone) was substantially 1:1. This would result in applying the trailer brakes first but maintaining a uniform brake pressure ratio between tractor and trailer thereafter.

While the valve assembly illustrated and described herein is fully capable of achieving the objects and providing the advantages hereinbefore set forth, it will be realized that it is capable of considerable modification without departure from the spirit of the invention. For this reason, I do not mean to be limited to the form shown and described, but rather to the scope of the appended claims.

I claim:

1. A fluid pressure actuated relay valve of the class described comprising in combination: a valve body having a plurality of fluid passageways therein; a valving member supported for movement in said body to selectively block or intercommunicate said passageways; a body section adjoining said valve body and having a cylindrical bore formed therein on an axis aligned with the direction of movement of said valving member; a fluid connection formed in said body section to connect said cylindrical bore to a source of actuating fluid; a piston slidably and sealably supported in said cylindrical bore, said piston having a coaxial cylindrical bore therein; a plunger sealably and slidably supported in said piston bore, and cooperating with said piston and first bore to form an expansible actuating chamber; a stem and an abutment on said plunger, said stem extending toward said valving member; a compression spring surrounding said stem with an inner end anchored against said abutment, and also against said piston; and a thrust member slidably carried by said stem resting against the outer end of said spring and positioned to engage said valving member whereby thrust of said piston or plunger, or both, is transmitted through said spring to said valving member to move the same in response to fluid pressure in said expansible actuating chamber.

2. A fluid pressure actuated relay valve of the class described comprising in combination: a valve body having a plurality of fluid passageways therein; a valving member supported for movement in said body to selectively block or intercommunicate said passageways; means forming an expansible fluid-tight enclosure adapted to receive actuating fluid; a first wall portion of said enclosure having a fixed, predetermined, pressure responsive area and being adapted for movement in response to fluid pressure therein to expand the volume of said enclosure; a second wall portion of said enclosure adapted for movement independent of said first wall portion in response to fluid pressure in said enclosure to expand the volume thereof; stop means positioned and adapted to limit the movement of said first wall portion to less than that of said second wall portion; and force transmitting means operatively connected between each of said wall portions and said valving member whereby to move the latter in response to movement of either or both of said wall portions.

3. A fluid pressure actuated relay valve of the class described comprising in combination: a three-way valve having a first fluid connection adapted for connection to a source of vacuum, a second fluid connection adapted for connection to an air-vacuum power unit, a vent to atmosphere, and a movable valving member arranged for movement in a first direction to block said vent, and concurrently communicate said first and second fluid connections, or selective movement in the oppostie direction to block said first fluid connection and communicate said second fluid connection with said vent; a spring connected to said valving member and normally urging the same in said opposite direction; and hydraulic actuating means including an actuating pressure chamber adapted for connection to a source of hydraulic fluid, and adjoining pressure responsive elements each of fixed predetermined area and together forming pressure wall means for said actuating chamber movable in response to increasing pressure in said actuating chamber, said wall means being operatively connected to said valving member to move the same in said first direction upon increase in said actuating fluid pressure and said wall means having one element thereof limited in its movement as compared to the other element whereby to change the rate of increase of force exerted by said wall means for a given rate of increase of pressure in said actuating chamber after a predetermined initial movement of said wall means.

4. A fluid pressure actuated relay valve of the class described comprising in combination: a three-way valve having a first fluid connection adapted for connection to a source of vacuum, a second fluid connection adapted for connection to an air-vacuum power unit, a vent to atmosphere, and a movable valving member arranged for movement in a first direction to block said vent, and concurrently communicate said first and second fluid connections, or selective movement in the opposite direction to block said first fluid connection and communicate said second fluid connection with said vent; a movable separatory wall exposed on one side to atmospheric pressure and on the other side to the pressure at said second fluid connection, said separatory wall being operatively connected to said valving member to resist movement thereof in said first direction by a force proportional to the difference in pressure between said second fluid connection and atmosphere; and hydraulic actuating means including an actuating pressure chamber adapted for connection to a source of hydraulic fluid, and adjoining pressure responsive elements each of fixed predetermined area and together forming pressure wall means for said actuating chamber movable in response to increasing pressure in said actuating chamber, said wall means being operatively connected to said valving member to move the same in said first direction upon increase in said actuating fluid pressure and said wall means having one element thereof limited in its movement whereby to change the rate of increase of force exerted by said wall for a given rate of increase of pressure in said actuating chamber after a predetermined initial movement of said wall.

5. A fluid pressure actuated relay valve of the class described comprising in combination: a valve body having a vacuum chamber, a power pressure chamber, and an atmospheric pressure chamber; a first fluid connection formed in said body for said vacuum chamber and adapted for connection to a source of vacuum; a second fluid connection formed in said body for said power chamber and adapted for connection to an air-vacuum power unit; a first valve seat in said body facing in a given direction and disposed between said vacuum chamber and power chamber to form a port therebetween; a flexible annular diaphragm disposed in said body to separate said power chamber and atmospheric pressure chamber; a second valve seat centrally supported on said diaphragm, movable therewith, facing in the same direction as said first seat, and forming a second port between said power pressure chamber and atmospheric pressure chamber; a valving member movably supported in said body and normally resting on said first seat to close said first port, said valving member having a portion disposed in the path of movement of said second seat to contact the same and close said second port upon initial movement of said second seat in a direction away from said power chamber and to lift said valving member upon further movement of said second seat in said direction; a body section adjoining said valve body and having a cylindrical bore formed therein on an axis aligned with said direction of seat movement; a fluid connection formed in said body section for said cylindrical bore to connect the same to a source of actuating fluid; a piston slidably and sealingly supported in said cylindrical bore, said piston having a coaxial cylindrical bore therein; a plunger sealably and slidably supported in said piston bore and cooperating with said piston and first bore to form an expansible actuating chamber; a stem and an abutment on said plunger, said stem extending toward said seat; a compression spring surrounding said stem with an inner end anchored against said abutment and also against said piston; and a thrust member slidably carried by said stem, resting against the outer end of said spring, and positioned to engage said second seat whereby thrust of said piston or plunger, or both is transmitted through said spring to said seat to move the same in said direction.

6. In combination in a vehicle braking system of the type having a source of fluid at a pressure different from atmosphere, a primary manually operated hydraulic system, and a secondary system operated by a power unit deriving power from said pressure source, a relay valve for actuating said power unit in response to operation of said primary system comprising: control means including a three-way air valve connected between said source and power unit, said valve being adapted for selective operation to connect said power unit to said source or atmosphere; and actuating means for said valve including separately movable pressure responsive elements exposed to the fluid pressure in said primary hydraulic system, each of said elements being operatively connected to said valve and one of said elements being adapted to respond to a range of pressures different from the range of the other element whereby movement of either or both of said elements in response to pressure in said chamber operates said valve to actuate said power unit over substantially the entire range of pressures in said primary system.

7. In combination in a vehicle braking system of the type having a source of fluid at a pressure different from atmosphere, a primary manually operated hydraulic system, and a secondary system operated by a power unit deriving power from said pressure source, a relay valve for actuating said power unit in response to operation of said primary system comprising: control means including a three-way air valve connected between said source and power unit, said valve being adapted for selective operation to connect said power unit to said source or atmosphere; and actuating means for said valve including an expansible chamber connected to receive fluid from said primary system and independently movable wall portions of said chamber, one being adapted to respond to a lower range of pressures than the other and each being operatively connected to said valve whereby movement of either or both of said wall portions in response to pressure in said chamber operates said valve to actuate said power unit.

8. The construction of claim 7 further characterized by having an abutment in said actuating means to limit the movement of one of said wall portions whereby an initial increase at a given rate in said primary fluid pressure creates an operative force on said valve increasing at a first rate and further increase in said primary fluid pressure at said given rate increases said force at a second, lesser rate.

9. In combination in a vehicle braking system of the type having a source of fluid at a pressure different from atmosphere, a primary manually operated hydraulic system, and a secondary system operated by a power unit deriving power from said pressure source, a relay valve for actuating said power unit in response to operation of said primary system comprising: control means including a three-way air valve connected between said source and power unit, said valve being adapted for selective operation to connect said power unit to said source or atmosphere; a movable pressure wall in said valve exposed on one side to atmospheric pressure and on the other side to the fluid pressure in said power unit, said wall being arranged and connected in said valve to resist the operation thereof by a force proportional to the differential in pressure between said power unit and atmosphere; and actuating means for said valve including separately movable pressure responsive elements exposed to the fluid pressure in said primary hydraulic system, one being adapted to respond to a lower range of pressures than the other and each being operatively connected to said valve whereby movement of either or both of said elements in response to pressure in said chamber operates said valve to actuate said power unit.

10. In combination in a vehicle braking system of the type having a source of fluid at a pressure different from atmosphere, a primary manually operated hydraulic system, and a secondary system operated by a power unit deriving power from said pressure source, a relay valve for actuating said power unit in response to operation of said primary system comprising: control means including a three-way air valve connected between said source and power unit, said valve being adapted for selective operation to connect said power unit to said source or atmosphere; a spring connected in said valve to yieldingly resist operation thereof whereby a predetermined minimum operating force is required to operate said valve; and actuating means for said valve including separately movable pressure responsive elements exposed to the fluid pressure in said primary hydraulic system, one being adapted to respond to a lower range of pressures than the other and each being operatively connected to said valve whereby movement of either or both of said elements in response to pressure in said chamber operates said valve to actuate said power unit.

11. The construction of claim 10 further characterized by having means in said valve to adjust the prestress in said spring whereby to adjust said minimum valve operating force.

12. For use in a hydraulically actuated relay valve, a pressure responsive actuating assembly comprising: a piston having a substantially axial bore therethrough; a plunger sealably carried for sliding movement in said bore; abutment means carried by one of the two next mentioned members to limit said sliding movement of said plunger in said piston in one direction; a hydrocylinder receiving said piston for sliding movement substantially parallel to said plunger movement; second abutment means carried by one of the two next mentioned members to limit said piston movement in said hydrocylinder in a direction opposite said first direction; and means connected to said piston and plunger to transmit the motion of either or both thereof.

13. A fluid pressure actuated relay valve of the class described comprising in combination: a valve body having a plurality of fluid passageways therein; a valving member supported for movement in said body to selectively block or intercommunicate said passageways; means forming an expansible fluid-tight enclosure adapted to receive actuating fluid; a first wall portion of said enclosure having a fixed predetermined pressure responsive area and being adapted for movement in response to fluid pressure therein to expand the volume of said enclosure; a second wall portion of said enclosure adapted for movement independent of said first wall portion in response to fluid pressure in said enclosure to expand the volume thereof; stop means positioned and adapted to limit the movement of said first wall portion to less than that of said second wall portion; and a force transmitting member abutting both said wall portions and operatively connected to said valving member whereby to move the latter in response to movement of either or both said wall portions.

14. A fluid pressure actuated relay valve of the class described comprising in combination: a valve body having a plurality of fluid passageways therein; a valving member supported for movement in said body to selectively block or intercommunicate said passageways; means forming an expansible fluid-tight enclosure adapted to receive actuating fluid, a first wall portion of said enclosure having a fixed predetermined pressure responsive area and being adapted for movement in response to fluid pressure in said enclosure to expand the volume thereof; stop means positioned and adapted to limit the movement of said first wall portion to less than that of said second wall portion; and a prestressed yieldable spring abutting both said wall portions and operatively connected to said valving member whereby to move the latter in response to movement of either or both said wall portions, and whereby to permit motion of one or both of said wall portions without corresponding movement of said valving member when resistance of said valving member to movement exceeds the prestress force in said spring.

15. A fluid pressure actuated relay valve of the class described comprising in combination: a valve body having a plurality of fluid passageways therein; a valving member supported for movement in said body to selectively block or intercommunicate said passageways; a pressure responsive member in said valve body positioned and adapted to resist movement of said valving member by a force proportional to the differential fluid pressure between two of said passageways; means forming an expansible fluid-tight enclosure adapted to receive actuating fluid; a first wall portion of said enclosure having a fixed predetermined pressure responsive area and being adapted for movement in response to fluid pressure therein to expand the volume of said enclosure; a second wall portion of said enclosure adapted for movement independent of said first wall portion in response to fluid pressure in said enclosure to expand the volume thereof; stop means positioned and adapted to limit the movement of said first wall portion to less than that of said second wall portion; and force transmitting means operatively connected between each of said wall portions and said valving member whereby to move the latter in response to movement of either or both of said wall portions, said force transmitting means including a lost-motion connection and yieldable spring means whereby to permit motion of at least one of said wall portions without corresponding movement of said valving means whenever the resisting force of said pressure responsive member exceeds the prestress force in said spring means.

16. A fluid pressure actuated relay valve of the class described comprising in combination: a valve body having a plurality of fluid passageways therein; a valving member supported for movement in said body to selectively block or intercommunicate said passageways; a pressure responsive member in said valve body positioned and adapted to resist movement of said valving member by a force proportional to the differential fluid pressure between two of said passageways; means forming an expansible fluid-tight enclosure adapted to receive actuating fluid; a first wall portion of said enclosure having a fixed predetermined pressure responsive area and being adapted for movement in response to fluid pressure therein to expand the volume of said enclosure; a second wall portion of said enclosure adapted for movement independent of said first wall portion in response to fluid pressure in said enclosure to expand the volume thereof; stop means positioned and adapted to limit the movement of said first wall portion to less than that of said second wall portion; and a prestressed contractible compression spring abutting both said wall portions and operatively connected to said valving member whereby to move the latter in response to movement of either or both said wall portions, and whereby to permit motion of one or both of said wall portions without corresponding movement of said valving member when the resisting force of said pressure responsive member exceeds the prestress force in said spring.

References Cited in the file of this patent

UNITED STATES PATENTS

| | | |
|---|---|---|
| 2,028,631 | Stevens | Jan. 21, 1936 |
| 2,044,452 | Terry | June 16, 1936 |
| 2,215,172 | Christensen | Sept. 17, 1940 |
| 2,215,602 | Baade | Sept. 24, 1940 |
| 2,230,048 | Elliott | Jan. 28, 1941 |
| 2,332,340 | Price | Oct. 19, 1943 |
| 2,429,194 | Price | Oct. 14, 1947 |
| 2,463,172 | Gunderson | Mar. 1, 1949 |
| 2,498,108 | Gunderson | Feb. 21, 1950 |
| 2,566,614 | Huyck | Sept. 4, 1951 |

FOREIGN PATENTS

| | | |
|---|---|---|
| 639,201 | Germany | Dec. 1, 1936 |